United States Patent [19]

Adams

[11] Patent Number: 5,495,291
[45] Date of Patent: Feb. 27, 1996

[54] DECOMPRESSION SYSTEM FOR COMPRESSED VIDEO DATA FOR PROVIDING UNINTERRUPTED DECOMPRESSED VIDEO DATA OUTPUT

[75] Inventor: Christopher Adams, Menlo Park, Calif.

[73] Assignee: Hewlett-Packard Company, Palo Alto, Calif.

[21] Appl. No.: 278,761

[22] Filed: Jul. 22, 1994

[51] Int. Cl.⁶ ........................................................ H04N 7/26
[52] U.S. Cl. ............................................. 348/390; 348/402
[58] Field of Search ........................................ 348/390, 397, 348/402, 403; H04N 7/133, 7/137, 7/26

[56] References Cited

U.S. PATENT DOCUMENTS 5,379,070  1/1995  Retter ........................................ 348/403
5,381,145  1/1995  Allen ......................................... 348/397
5,394,189  2/1995  Motomura ................................ 348/402

*Primary Examiner*—Howard W. Britton
*Attorney, Agent, or Firm*—Jonathan B. Penn

[57] ABSTRACT

A video decompression system for decompressing consecutive streams of compressed video data to provide a continuous, uninterrupted decompressed video data output stream. The system is comprised of a plurality of decompression circuits, each circuit having a compressed video data buffer, a decoder, and a decompressed video data buffer. Each of the compressed video data buffers is coupled to an input switch and each of the decompressed video data buffers is coupled to an output switch. A controller operates the system. Decompression can occur simultaneously in all of the decompression circuits. This simultaneous decompression results, when necessary, in each decompression circuit having several frames of decompressed video data available for immediate display before that decompressed video data is actually required.

20 Claims, 3 Drawing Sheets

DECOMPRESSION SYSTEM FOR COMPRESSED VIDEO DATA FOR PROVIDING UNINTERRUPTED DECOMPRESSED VIDEO DATA OUTPUT

BACKGROUND OF THE INVENTION

This invention is in the field of video data and the provision of video data to users. In particular, it relates to methods and apparatus for decompresing compressed video data.

For purposes of this description, video data typically comprises the video and audio data contained in a stored video program. However, other data including but not limited to text and graphics may be included in the video data without in any way affecting the operation of the present invention or the substance of this description. All references herein to video data should therefore be considered in the broadest sense.

Video servers for providing video data to users are known. Although uncompressed video data can be stored in such servers and sent to users, the sheer amount of data in even a short video program usually requires that the video data be stored and manipulated in a compressed form. Methods and apparatus for accomplishing the compression and decompression of video data are known.

One known compression format is sponsored by the Motion Picture Expert Group and is known as MPEG. Although both an MPEG-1 and an MPEG-2 compression format are known, their differences are not relevant to the present invention.

MPEG compression is based on the fact that from one frame of video data to the next, there are comparatively few changes, even when objects or persons are in motion. It is therefore not necessary to store all of the video data contained in each frame. Rather, after a base frame has been stored, each successive frame can be recreated by storing only the video data that describes objects or persons that have either changed or moved. Periodically, a complete frame of video data must be stored to re-initialize the process. This type of data compression is called motion compensation.

MPEG compressed video data consists of three types of frames. The first, an intra coded frame (hence, an I-frame) provides all the video data needed to fully describe that particular frame. A predicted frame (hence, a P-frame) provides only information about how the P-frame differs from the last I- or P-frame. Finally, a bi-directional frame (hence, a B-frame) provides information about how the B-frame differs from both the preceding I- or P-frame and the next I- or P-frame. The decompression of the video data contained in a B-frame requires the decompression of two frames, either both I-frames, an I-frame and P-frame, or both P-frames. Decompressing a P-frame requires the video data contained in the preceding P- or I-frame. Typically, storing an I-frame requires three times as many bits as a P-frame, and storing a P-frame requires roughly three times as many bits as a B-frame. These relative storage requirements of the I-, B-, and P-frames are provided only for comparison purposes and no limitation of the present invention to the stated relative storage requirements should be implied.

FIG. 1 shows the typical transmission and display order of a series of MPEG compressed video data frames. As P-frames need the video data contained in a decoded I-frame to be decoded, and as B-frames need the video data contained in either or both a decoded I-frame and a P-frame, the transmission order of compressed MPEG frames differs from the display order of decompressed MPEG frames. Both the transmitted and displayed frames begin with an I-frame, and another I-frame occurs roughly every fifteen frames thereafter. During transmission, two B-frames are preceded by a P-frame. When displayed, after the first I-frame, two B-frames follow, and then a P-frame. As neither a B-frame or a P-frame can be decompressed without reference to an I-frame, all compressed video data streams must begin with an I-frame.

A known architecture for decoding MPEG video data streams is shown in FIG. 2. Decompression system 10 consists of compressed video data buffer 11, decoder 13, and decompressed video data buffer 17. An input bus 15 provides a stream of compressed MPEG video data to buffer 11. As bus 15 provides video data at a fixed rate, some time elapses before enough video data is stored in buffer 11 for decoder 13 to begin decompressing the video data.

A latency time exists before enough video data enters buffer 11 for decoder 13 to begin decompression. This latency time is herein called buffer filling latency time. An even longer latency time occurs due to the nature of the MPEG video data. Either an I-frame and a P-frame, two P-frames, or two I-frames must be decompressed and available before a B-frame can be decompressed. Typically two B-frames are transmitted after a P-frame. The system must receive and decompress these I- and/or P-frames before the B-frames can be decompressed. The time required for this decoding and reordering is herein called a reordering latency time.

The effect of the reordering latency time is noticeable every time a new video program begins. The reordering latency time and the buffer filling latency time together result in the system generating several blank frames between the old and new video programs while the new video program is decompressed sufficiently for display. In some known systems, as many as eight such blank frames are generated between two consecutive video programs. These blank frames are highly undesirable.

At present, no known system corrects this deficiency at acceptable cost.

SUMMARY OF THE INVENTION

A first preferred embodiment of the present invention comprises a video decompression system that can accept multiple compressed video data streams as input. For purposes of this description a compressed video data stream can be comprised of a single video program or multiple video programs. Different video data streams will therefore comprises different individual video programs. The video data streams may be available simultaneously at the input of the present invention or they can be received at different times. The system will decompress and display a first video data stream. Prior to the end of the first video data stream, the system will begin accepting as input and decompressing another video data stream. At least several frames of the MPEG compressed video data comprising the second video data stream will be decompressed and available for display as soon as the first video data stream ends. The buffer filling and reordering latency times which occur when the present invention begins to decompress its first video data stream occur off-line, so the user has no direct experience of it. As successive video data streams begin, their buffer filling and reordering latency time occur while the previous video data stream is being decompressed and displayed. The user does not experience these latencies either. In known systems, the user experiences both the buffer filling and the reordering latency times as blank frames between successive video data streams every time a new video data stream begins.

In the preferred embodiment, the input switch controls the flow rate of two video data streams on two video data input lines which comprise the inputs of the preferred embodiment. Initially, the first video data stream flows into the present invention at a first rate. When the second video data stream is later allowed to flow, it flows into the system at a second rate on the second line. In the preferred embodiment, the first rate is higher than the second rate. In other embodiments, this need not be the case. The input switch can halt the flow of either stream.

The input switch is in turn coupled to two decompression circuits, each circuit comprising a compressed video data buffer, a decoder, and a decompressed video data buffer. Incoming compressed video data is stored in the compressed video data buffer, decompressed in the decoder, and stored temporarily in the decompressed video data buffer. The decompressed video data buffer from both circuits is in turn coupled to an output switch.

Both decompression circuits and the input and output switch are coupled to a microcontroller. Under instructions from a stream scheduler, the microcontroller determines which decompression circuit will accept video data at the first rate and which will accept it the second rate. The first decompression circuit receives the first video data stream at the first rate, decompress it, and provides it to the output bus.

Prior to the end of the first video data stream, the system will instruct the input switch to begin flowing the second video data stream into the second decompression circuit at the second rate. Several frames of the second video data stream will be decompressed and stored in the decompressed video data buffer before the first video data stream ends. When the first video data streams ends, the system immediately begins to display the decompressed second video data stream and simultaneously increases the rate of video data flow into the second decompression circuit to the first rate. In this manner, successive video data streams are displayed without the user seeing any blank frames between the video data streams or experiencing the buffer filling and reordering latency times directly.

Processing at first and second rates by alternate decompression circuits continues indefinitely until all video data streams have been displayed.

The preferred embodiment will now be described in detail with reference to the figures listed and described below.

BRIEF DESCRIPTION OF THE ILLUSTRATIONS

DETAILED DESCRIPTION OF THE PREFERRED EMBODIMENT

Figure 1:
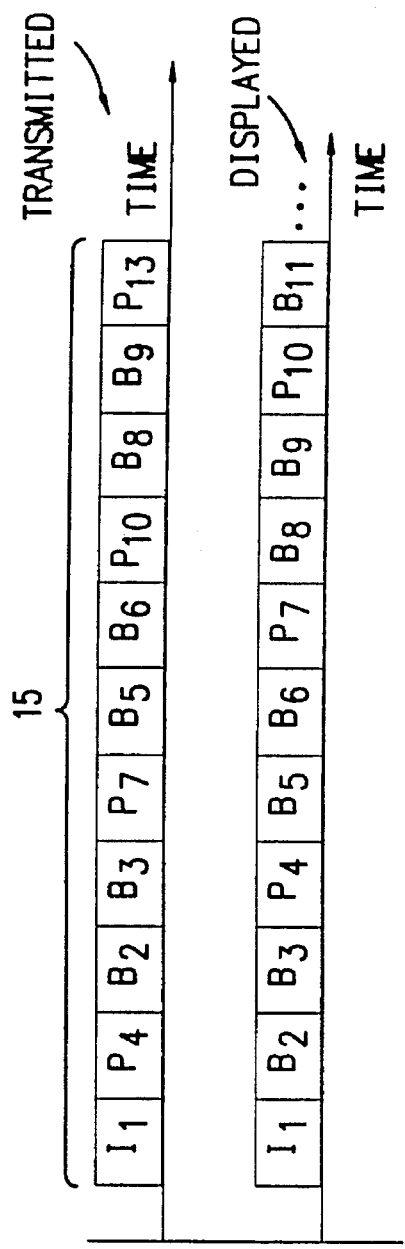
FIG. 1 shows typical MPEG compressed frame transmission and decompressed frame display sequences (Prior Art)
Figure 2:
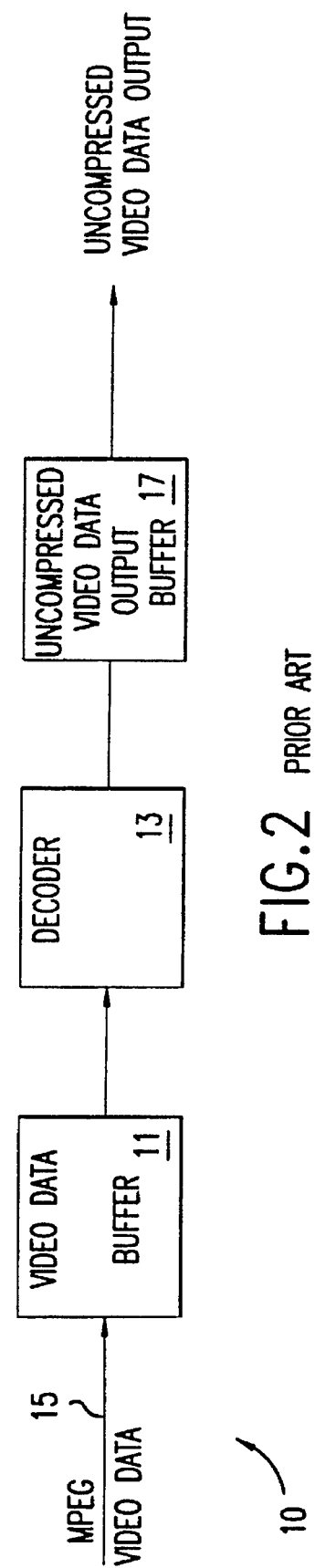
FIG. 2 shows a known system for decompressing video data (Prior Art)
Figure 3:
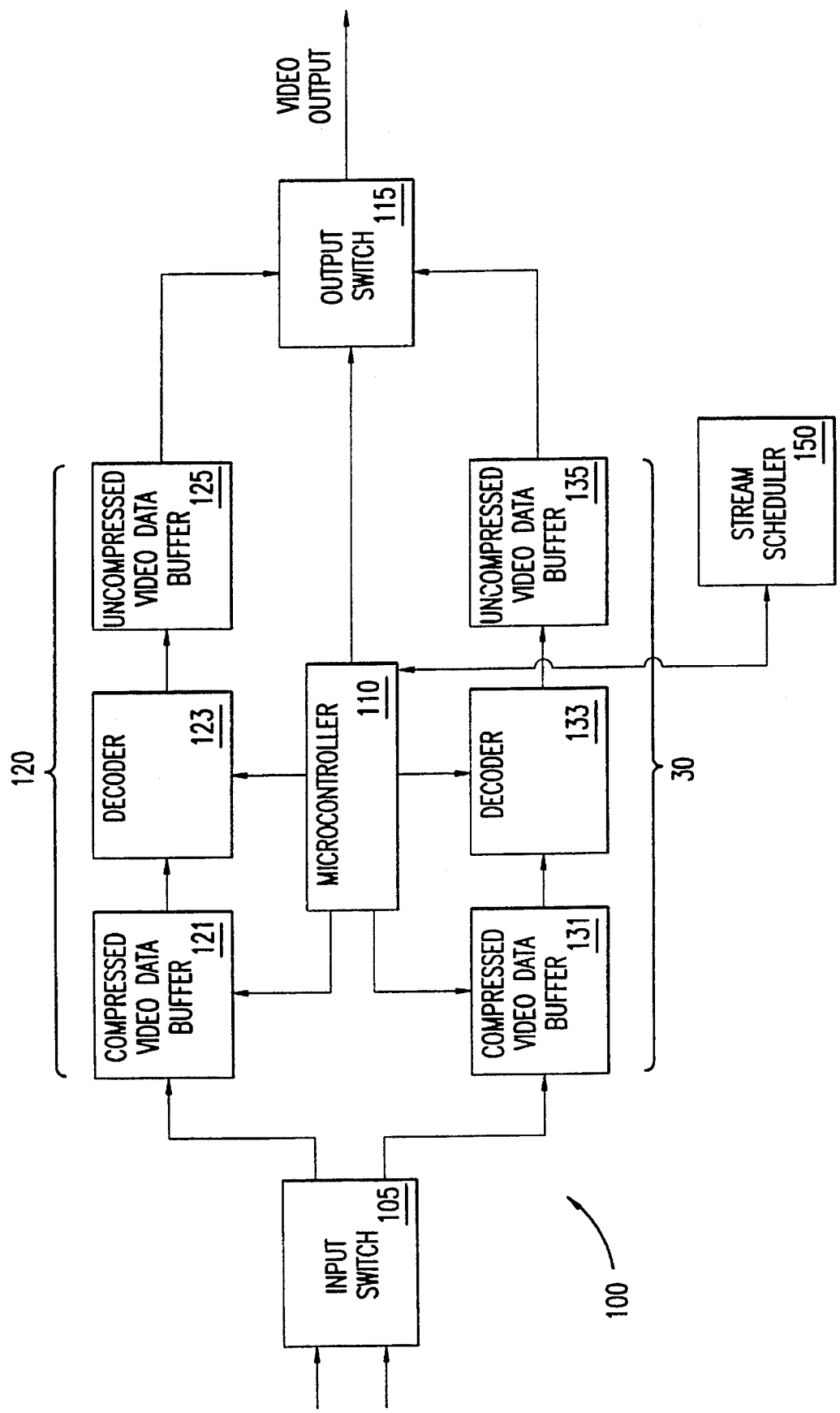
FIG. 3 is a block diagram of the preferred embodiment of the present invention.

A first preferred embodiment of the present invention is illustrated in FIG. 3. Decompression system 100 comprises input switch 105, first and second decompression circuits 120 and 130, which in turn are further comprised respectively of compressed video data buffers 121 and 131, first and second decoders 123 and 133, decompressed video data buffers 125 and 135, output switch 115 and microcontroller 110. Stream scheduler 150 is coupled to microcontroller 110. Microcontroller 110 is a commercially available Motorola 68331 microcontroller and requires no further description herein.

In each decompression circuit, the compressed video data buffer is coupled to the decoder, which is in turn coupled to the decompressed video data buffer. The decoders in the preferred embodiment are commercially available STI 3500 MPEG decoders from SGS Thompson and require no further description herein.

Input switch 105 is coupled to two compressed video data input lines, both compressed video data buffers 121 and 131, and to microcontroller 110. Output switch 115 is similarly coupled to decompressed video data buffers 125 and 135 and to microcontroller 110. Microcontroller 110 is further coupled to both decoders 123 and 133, the two compressed video data buffers 121 and 131, as well as to steam scheduler 150. Although microcontroller 110 receives instructions from stream scheduler 150, stream scheduler 150 does not form part of the present invention.

Although shown as separate buffers in FIG. 3, the compressed and decompressed video data buffers can be realized as a single buffer, which would be accessed in a known manner. exact configuration of the buffers can therefore be varied considerably from the illustrated embodiment without changing the present invention in a material way. In the preferred embodiment, the buffers comprise eight 256K words by 16 bits dynamic random access memories ("DRAMs") coupled to the decoder. The DRAMs are commercially available from many vendors, including Hitachi, and require no further description herein.

In operation, two separate compressed video data streams enter input switch 105. Under command of microcontroller 110, video data flows into one of the decompression circuits at a first rate and flows into the other at a second rate. For purposes of this description only, and without implying any limitation, video data will be assumed to flow initially into decompression circuit 120 at a high rate and into decompression circuit 130 at a lower rate. It should be understood that nothing herein constrains the second rate to be less than the first rate. Although the preferred first embodiment uses a first rate of 15 megabits per second and a second rate of 7.5 megabits per second, these rates were chosen to reduce overall bandwidth demands. The second rate in other embodiments could be the same or indeed higher than the first rate.

As compressed video data buffer 121 begins to fill with the video data it is receiving at a high rate, decoder 123 begins decompressing that video data. Decompressed frames of video data are stored in decompressed video data buffer 125. After the first I- and P-frames have been decompressed and stored in decompressed video data buffer 125, decompression of the B-frames that separated the I- and P-frames begins. Decompressed video data frames are removed from decompressed video data buffer 125 in the proper order under the direction of microcontroller 110 and sent through output switch 115 to an output bus.

When the first compressed video data stream is nearly finished, the process of decompression begins in decompression circuit 120. Microcontroller 110 instructs input switch 105 to begin flowing the second compressed video data stream into decompression circuit 130, albeit at the second, lower rate. If the video stream being decompressed in decompression circuit 120 is very long, it is possible that decompression circuit 130 will fill its decompressed video data buffer to capacity prior to the completion of the first video data stream, despite the microcontroller only ordering the second decompression circuit to begin operation shortly before the first video data stream is predicted to end. Microcontroller 110 will in that case instruct input switch 105 to stop the flow of video data into decompression circuit 130.

Once the video program flowing into decompression circuit 120 ends, decompression circuit 130 has several frames of video data decompressed and ready for immediate display or output. Output switch 115 would be instructed by microcontroller 110 to switch the output to decompression circuit 130 as the output from decompression circuit 120 ends, insuring a continuous generation of decompressed video data without any blank frames between video streams. Input switch 105 also begins to flow the second video data stream into decompression circuit 130 at the higher, first rate of video data flow. Input switch 105 may provide decompression circuit 120 with a low rate of video data immediately, but it is more likely that no video data will be flowed into decompression circuit 120 for at least some interval of time. This process would continue alternatively, with each decompression circuit alternatively providing the output from the system. In this manner, the buffer filling and reordering latency times are not experienced by system users and no blank frames occur between video programs.

Figure 4:
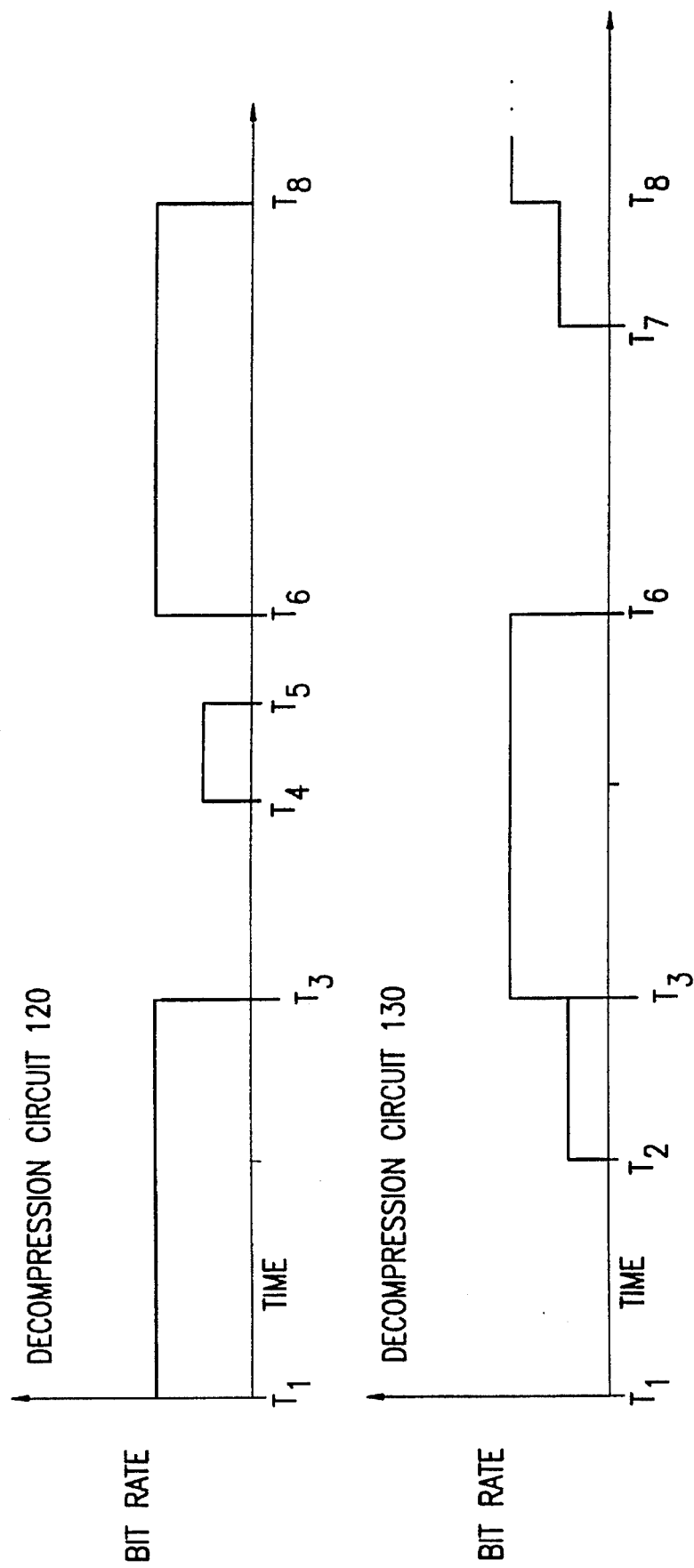
FIG. 4 is an example showing the relative rates of video data transmission through the first and second decompression circuits of the present invention during typical use.

An example of the process of alternatively providing video data to decompression circuits 120 and 130 is illustrated graphically in FIG. 4. At time $T_1$, decompression circuit 120 is receiving and decompressing a first video data stream at a high rate. Decompression circuit 130 is not receiving video data. At time $T_2$, microcontroller 110 has instructed input switch 105 to begin flowing the second video data stream into decompression circuit 130 at the second, lower rate. At time $T_3$, the first video data stream being processed by decompression circuit 120 ends. Immediately, decompression circuit 130 begins receiving video data at a high rate, while simultaneously sending its stored decompressed video data frames to the output bus. At time $T_4$, microcontroller 110 instructs input switch 105 to begin flowing the next video data stream into first decompression circuit 120 at the second, lower rate. At time $T_5$, the buffers in decompression circuit 120 are full and video data flow to that circuit ceases. At time $T_6$, the video data stream being decompressed by decompression circuit 130 ends. Decompression circuit 120 now receives its next video data stream at the high, first rate, while providing its stored decompressed video data frames to the output bus. Video data stream input to decompression circuit 130 ends until time $T_7$, when microcontroller 110 again instructs input switch 105 to begin flowing the next video data stream into decompression circuit 130 at the second, lower rate. At time $T_8$, the video data stream being decompressed by decompression circuit 120 ends and data stream input to that circuit is also ended, while simultaneously video data stream input to decompression circuit 130 is increased to the first, high rate and the stored frames of decompressed video data in decompression circuit 130's buffer are provided as output. This sequential process continues until all video data streams provided as input have been decompressed and provided as output in a continuous output stream.

Although the present invention has been described in detail with reference to only two decompression circuits, nothing herein should be taken to limit the present invention to only two such circuits. The expansion of the system to more decompression circuits would be a straightforward process and would provide even greater system flexibility and usefulness. In a system with more than two decompression circuits, the switching process would obviously not have to occur alternatively or sequentially.

The present invention can be used in a real time display system, where different video programs must be displayed consecutively without pause. Video "clips" can be played from random start points to random end points followed by another video "clip" with random start and end points, with no delay or blank frames between the "clips". It should be noted that such random start points will require additional flexibility from the system, as decompression will have to begin early enough to decompress the video data stream up to the "random" start point, as all preceding decompressed video data streams will have to be used to decompress the video data stream up to the chosen start point and then discarded. The present invention is also useful in video data editing systems, where video data programs or portions of programs must be spliced together. Video program insertion, advertisement insertion and video editing are all environments within which the present invention would be useful.

What is claimed is:

1. A system for decompressing video data streams and for providing continuous video data output, the system comprising:

an input switch coupled to a plurality of compressed video data input lines, the switch capable of selecting input lines and capable of controlling the video data flow rate of the selected input lines;

a plurality of decompression modules coupled to the input switch for decompressing compressed video data received from the input switch and storing decompressed video data;

an output switch coupled to the decompression modules, the output switch coupling only one of the decompression modules to an output bus at any time; and a controller coupled to the input switch, the decompression modules, and the output switch for selecting which decompression module will receive video data at a first predefined rate, the decompression module receiving video data at the first predefined rate also being coupled to the output bus by the output switch.

2. The system of claim 1 wherein the decompression modules further comprise:

a buffer for storing compressed video data;

a decoder for decompressing video data; and a buffer for storing decompressed video data.

3. The system of claim 2 wherein the buffer for storing compressed video data and the buffer for storing decompressed video data are formed as a single buffer.

4. The system of claim 3 wherein the controller commands the first switch to halt video data flow at the second rate if the video data decompression array receiving video data at the second rate cannot store any more decompressed video data.

5. The system of claim 1 wherein the decompression modules not receiving video data at the first predefined rate subsequently receive video data at a second predefined rate.

6. The system of claim 5 wherein the second predefined rate has the same bit per second rate as the first predefined rate.

7. The system of claim 5 wherein the second predefined rate has a lower bit per second rate than the first predefined rate.

8. The system of claim 7 wherein the second predefined rate has a higher bit per second rate than the first predefined rate.

9. A video decompression system comprising:

a first switch coupled to at least two video data input lines, the first switch controlling the direction and rate of video data flow from the video data input lines;

at least two video data decompression arrays coupled to the first switch, the video data decompression arrays storing compressed video data, decompressing the stored compressed video data, and storing the decompressed video data;

a second switch coupled to the video data decompression arrays and to an output bus, the second switch directing output from the at least two video data decompression arrays to the output bus; and a controller coupled to the first switch, the video data decompression arrays, and to the second switch for controlling the flow of video data through the system.

10. The system of claim 9 wherein the video decompression arrays further comprise:

video data storage means for compressed and decompressed video data; and decoders coupled to the video data storage means for decoding compressed video data.

11. The system of claim 9 wherein the controller commands the first switch to provide video data to the first video data decompression array at a first rate and to provide video data to the remaining video data decompression arrays at a second rate a predefined period of time after the first video data array begins receiving the video data at the first rate.

12. The system of claim 11 wherein the first rate is faster than the second rate.

13. The system of claim 11 wherein the first rate is the same as the second rate.

14. The system of claim 11 wherein the first rate is slower than the second rate.

15. The system of claim 11 wherein the controller commands the first switch to halt video data flow to the first video data decompression array after a video data stream being decompressed by the first video data decompression array has ended, the controller also commanding the first switch to provide video data to a second video data decompression array at the first rate after the first video data stream has ended.

16. The system of claim 11 wherein the controller commands the second switch to couple the first video data decompression array to the output bus while the first video data decompression array receives video data input at the first rate.

17. A method for providing continuous decompressed video data to an output from a plurality of compressed video data streams, the compressed video data streams, the method comprising the steps of:

receiving the plurality of compressed video data streams;

selecting a first video data stream;

decompressing the selected first video data stream at a first rate for the duration of the first video data stream;

decompressing the remaining video data streams at a second rate prior to the end of the first video data stream;

providing the decompressed first video data stream to the output; and repeating the selecting, decompressing, decompressing and providing steps until all the video data streams have been provided to the output.

18. The method of claim 17 wherein the first rate is greater than the second rate.

19. The method of claim 17 wherein the first rate is equal to the second rate.

20. The method of claim 17 wherein the first rate is less than the second rate.

* * * * *